United States Patent [19]

Hughey

[11] 3,965,240

[45] June 22, 1976

[54] HIGH DENSITY MAGNESIA PELLET AND METHOD FOR MAKING SAME

[75] Inventor: Vaughn V. Hughey, Tiffin, Ohio

[73] Assignee: Basic Incorporated, Cleveland, Ohio

[22] Filed: Dec. 12, 1973

[21] Appl. No.: 424,176

[52] U.S. Cl. ............................... 423/155; 423/636
[51] Int. Cl.² .................................. C01F 5/02
[58] Field of Search ................. 423/636, 635, 155; 23/313; 259/84; 106/58

[56] References Cited
UNITED STATES PATENTS

| | | | |
|---|---|---|---|
| 3,109,632 | 11/1963 | Wiegel | 259/84 |
| 3,379,419 | 4/1968 | Elrich et al. | 259/85 |
| 3,414,239 | 12/1968 | Elrich et al. | 259/104 |
| 3,420,507 | 1/1969 | Elrich et al. | 259/84 |
| 3,471,259 | 10/1969 | Sese | 423/636 |
| 3,674,241 | 7/1972 | Elrich et al. | 259/175 |
| 3,800,032 | 3/1974 | Eberle et al. | 423/636 |

OTHER PUBLICATIONS
Alien Property Custodian, Ser. No. 347,040, Apr. 27, 1943.

Primary Examiner—Oscar R. Vertiz
Assistant Examiner—Wayne A. Langel
Attorney, Agent, or Firm—Donnelly, Maky, Renner & Otto

[57] ABSTRACT

Caustic magnesia and magnesium hydroxide slurry are mixed together with sufficient energy in a countercurrent high energy mixer to form pellets of various sizes during hydration of the caustic magnesia. The pellets may be used as formed or may be calcined to caustic magnesia or deadburned in a kiln to refractory periclase.

10 Claims, 5 Drawing Figures

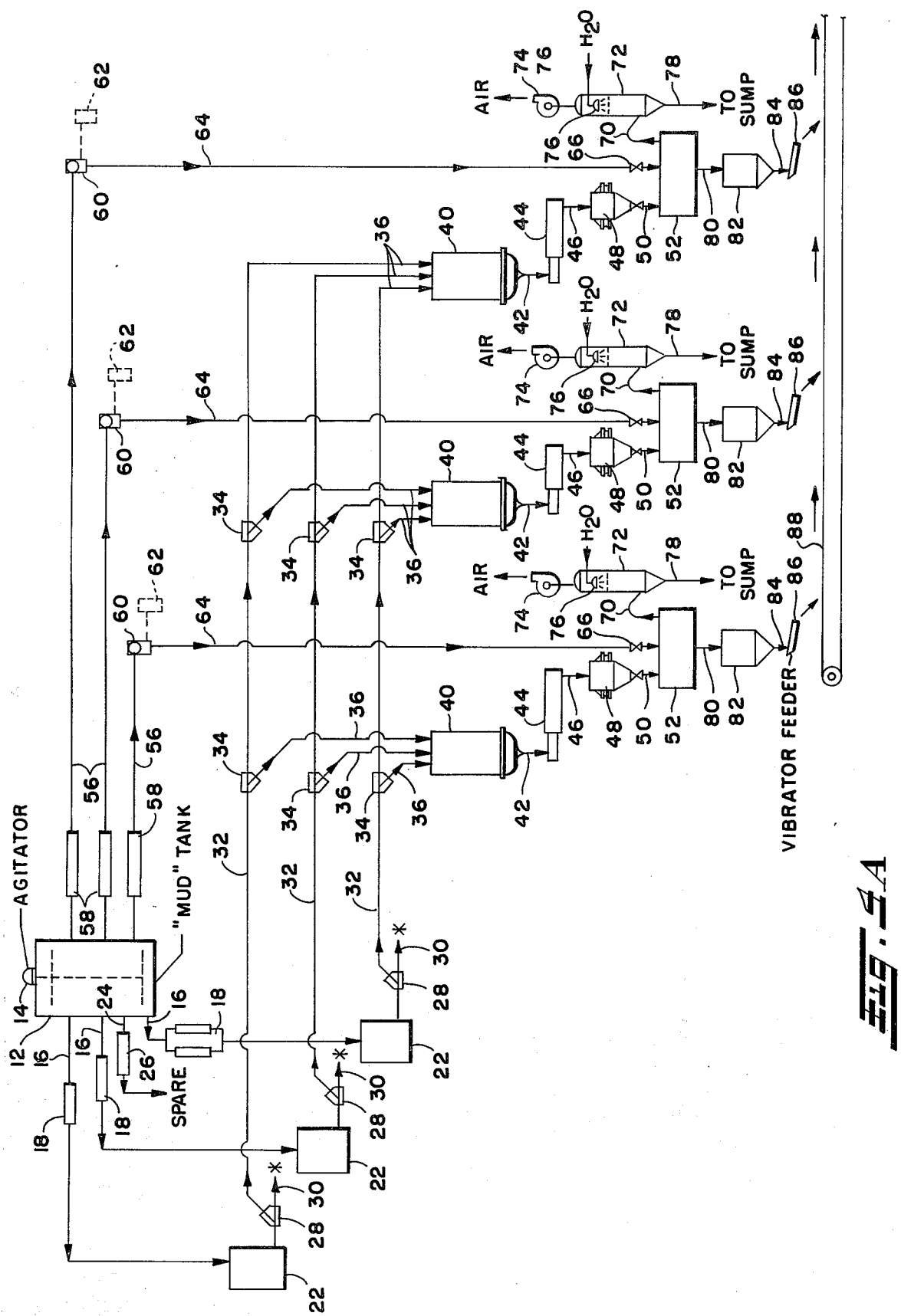

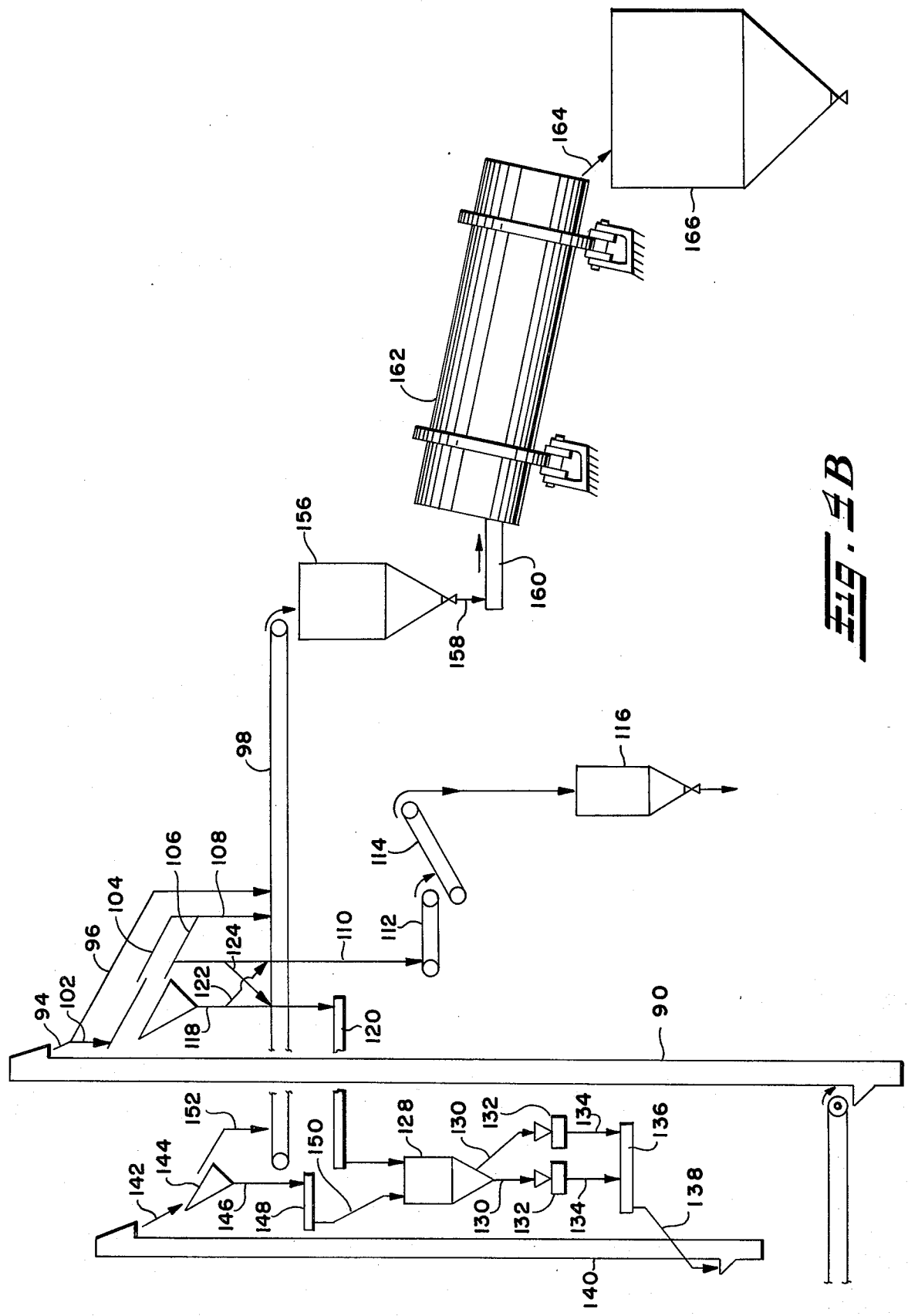

HIGH DENSITY MAGNESIA PELLET AND METHOD FOR MAKING SAME

BACKGROUND OF THE INVENTION

In the manufacture of a shaped or monolithic basic refractory for lining or repairing high temperature furnaces and kilns, the bricks, ramming or gunning mixes are customarily made from deadburned magnesia or dolomitic grains. Ideally, the assorted particles (grains) from which a refractory shape is manufactured should be composed of fine crystals of the metallic oxides. Mineralizers or other modifiers such as chrome ore may be present as components of the grains.

Fine, tight crystal formation within each grain of a refractory serves to prolong refractory life by reducing slag and metal intrusion and erosion. In addition, the assorted grains from which the refractory bricks or monolithic linings are made should be composed of an assortment of grain sizes and shapes which will pack tightly together and minimize slag and metal intrusion at the grain boundaries.

A grain assortment composed entirely of sized spheres has an ideal shape factor and will pack to leave a minimum of interstitial voids. It is, therefore, the ideal grain shape for forming refractory brick and shapes and monolithic linings and repairs. A number of processes for the production of spherical grains have been suggested and utilized. By way of example, spherical grain production has been accomplished by the introduction of magnesium hydroxide filter cake produced from sea water directly into a rotary kiln where the material rolls into essentially spherical pellets as it is being calcined. These spheres can be deadburned in the same kiln to produce a useful, but undesirably porous, refractory grain. To reduce porosity, the spherical nodules as calcined can be crushed and reformed into briquettes and then deadburned in a rotary or vertical kiln to form a more acceptable refractory grain. The deadburned briquettes must then be crushed to meet sizing requirements resulting in an angular grain assortment.

Another method for producing spherical pellets is to use a pan or disc pelletizer where calcined oxide powders are rolled into spheres much in the manner of rolling a miniature snowball. In this process a liquid such as water is utilized as a starting nucleus and to further wet the surface of the forming pellet to continue the accretion process to a desired pellet size.

Each of the above-mentioned processes makes spherical magnesia grains which, after deadburning in commercial kilns, produces grains having densities which approach, but do not reach, 3.4 grams per cubic centimeter. Each type of spherical pellet also has the common deficiency of an annular or a "cabbage leaf" cross-section which upon deadburning leaves voids. Further, the pellets prepared by the above-described process are prone to disintegration before they are deadburned and make alternative processing steps or other end use applications inefficient or impractical. Consequently, attempts to produce spherical refractory grain by pan pelletization or rotary kiln tumbling have enjoyed little commercial success in meeting the more rigorous refractory lining requirements.

Most refractory grain for use in the lining of oxygen converters for steel making is now made from natural or synthetic magnesium oxide which may originate as magnesite, dolomite, brucite, or magnesium chloride in sea water, bitterns or brines.

In the case of the natural materials, the carbonates or hydroxides may be deadburned in a rotary kiln or calcined first in a multiple hearth furnace or rotary kiln and the calcine is then fed to a briquetting press for shaping into a granule which can be further fired in a rotary or vertical kiln to produce dense refractory grain. In either instance, the size assortments necessary for brick forming are produced by crushing and screening the fired deadburned granules or briquettes.

Where sea water or brines are the starting material, magnesium hydroxide is formed from magnesium chloride by the wellknown chemical replacement technique, and the insoluble magnesium hydroxide slurry is collected as filter cake. The filter cake is calcined in rotary kilns or multiple hearth furnaces and the resulting oxide dust is briquetted and the briquettes are deadburned at high temperatures in rotary or vertical furnaces to produce grain after crushing and screening in the same manner as described previously for the natural materials.

The density of the grain produced from many of the briquette precursors may be good, but is always limited to angular shaped particle assortments which when made into a refractory will pack leaving more interstitial voids than would an assortment of spherical grains.

U.S. Pat. 3,666,851 describes a process for preparing high density magnesia refractories utilizing a hot pressing technique. A mixture of magnesium oxide and magnesium hydroxide is heated and hot pressed while the magnesium hydroxide decomposes to the oxide. Sintering of the hot pressed specimens produces final densities supposedly as high as 98% of the theoretical value.

Another method of preparing dense deadburned magnesia pellets is described in U.S. Pat. 2,348,847. This patent describes a procedure wherein a mixture of reactive magnesia and magnesium hydroxide is formed into nodules utilizing an extrusion process. The nodules are advanced to a device where they are tumbled to round the edges and where an exothermic reaction occurs resulting in the formation of round, hard, strong pellets. The pellets are subsequently deadburned to magnesia having a density in excess of 3.00.

SUMMARY OF THE DISCLOSURE

In accordance with the present invention, magnesium hydroxide and water is mixed with dry caustic magnesia in a high energy mixer, preferably a high intensity counter-current mixer, to produce very dense pellets having little or no free water. The water present in the slurry hydrates the caustic magnesia during the high intensity mixing in an exothermic reaction. The substantially spherical magnesium hydroxide pellets of assorted sizes prepared in this manner may be used for making briquettes or have many other uses such as a dustless cattle food mineral supplement. The pellets may be deadburned in a kiln at a temperature of about 1650°C. (3000°F.) or higher to produce substantially spherical magnesium oxide pellets having a density of at least 3.4 grams per cubic centimeter.

In a preferred embodiment, high purity magnesium hydroxide is obtained from sea water as a filter cake or slurry. A portion of this magnesium hydroxide filter cake is withdrawn and fed to a furnace where the water is removed to produce caustic magnesia which is highly reactive. This caustic magnesia is combined with an additional portion of magnesium hydroxide slurry in a counter-current high intensity mixer. During this mixing, the caustic magnesia is hydrated in an exothermic reaction and an assortment of sizes of very dense pellets are formed as described above.

As improved apparatus and method of producing the substantially spherical random sized pellets of magnesium hydroxide or magnesium oxide is described.

BRIEF DESCRIPTION OF THE DRAWINGS

The invention may take form in certain parts and arrangements of parts, preferred embodiments of which will be described in detail in this specification and illustrated in the accompanying drawings which form a part hereof.

FIG. 4A is a partial diagrammatic illustration of an apparatus constructed in accordance with the present invention;

FIG. 4B shows the remainder of the apparatus of FIG. 4A.

DESCRIPTION OF THE PREFERRED EMBODIMENTS

Figure 1:
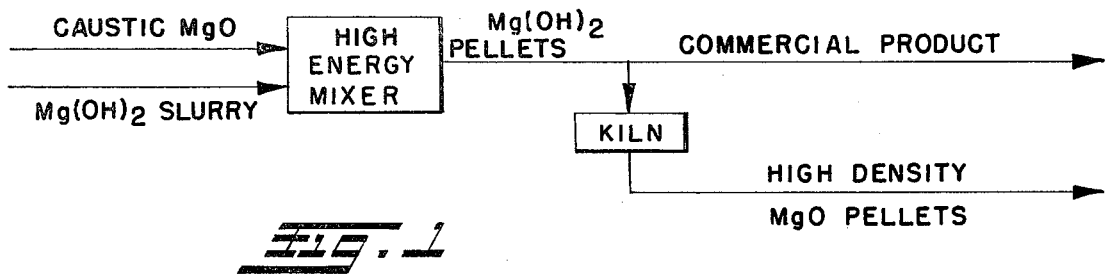
FIG. 1 is a schematic flow diagram of the process of the invention.

Referring now to the drawings, wherein the showings are for purposes of illustrating preferred embodiments of the invention only and not for purposes of limiting the same, FIG. 1 represents a schematic flow diagram of the process of the invention.

Caustic magnesia and a magnesium hydroxide slurry are fed to a high energy mixer where the caustic magnesia is hydrated during the mixing and pellets are formed. These pellets may be recovered as a commercial product or fed to a kiln where the pellets are converted to high density magnesium oxide pellets. The pellets obtained are of various random sizes, are non-layered and are spherical or substantially spherical in shape. As used in the specification and claims, the term "spherical pellets" includes spherical as well as substantially spherical pellets.

Figure 2:
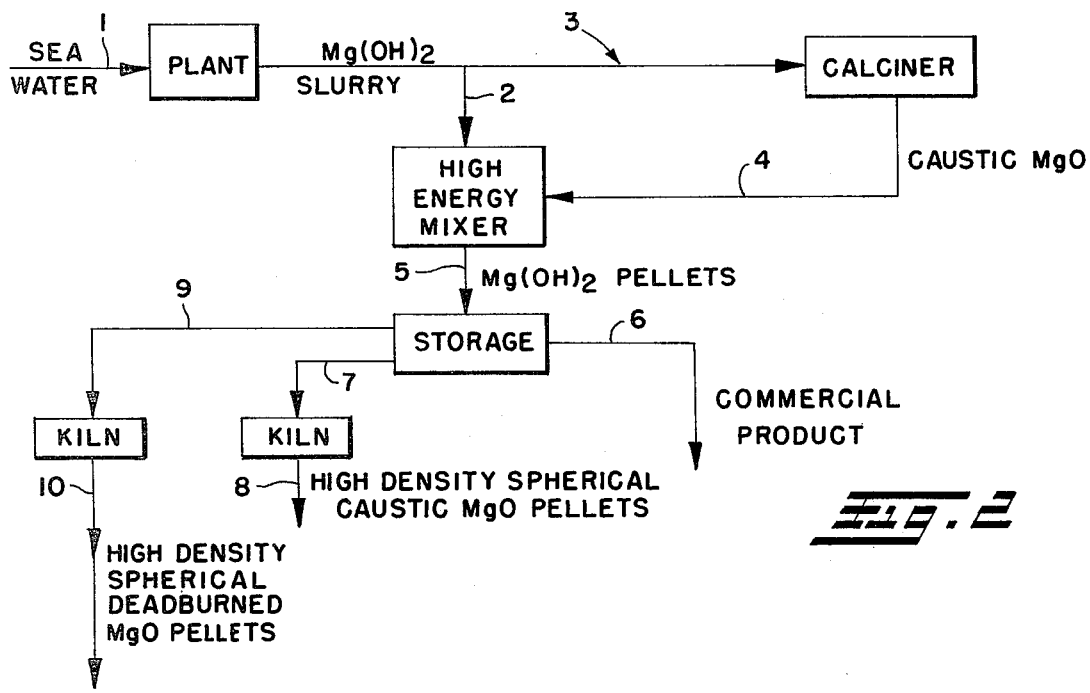
FIG. 2 is a more detailed schematic flow diagram of a preferred embodiment of the invention.

FIG. 2 illustrates a preferred embodiment where the source of both the caustic magnesia and the magnesium hydroxide slurry is a sea water magnesia plant. Sea water is fed to the plant as shown by arrow 1 where a high purity magnesium hydroxide slurry or filter cake is obtained. A portion of this slurry is fed to a high energy mixer as indicated by arrow 2, and another portion is fed to a calciner as shown by arrow 3 where it is converted to caustic magnesia.

The calcination of the magnesium hydroxide slurry to caustic magnesia can be accomplished in any suitable furnace such as a commercial rotary kiln. Multiple hearth type furnaces such as the Herreshoff furnace of the type described in Section 20, page 35 of "Chemical Engineers' Handbook", Fourth Edition, 1963, McGraw-Hill Book Co., are preferred. The filter cake or slurry is calcined in the multiple hearth furnace at a temperature below about 900°C. (1652°F.).

The caustic magnesia is fed from the calciner into the high energy mixer in controlled amounts as shown by arrow 4. The caustic magnesia and magnesium hydroxide slurry are introduced into the high energy mixer whereupon the caustic magnesia is thoroughly mixed with the magnesium hydroxide, while hydrating, and the mixture is recovered as random sized spherical pellets. These pellets can be recovered and stored as indicated by arrow 5 or sold as a commercial magnesium hydroxide pellet product as indicated by arrow 6. Also, these pellets can be fed to a kiln as indicated by arrow 7 where they are calcined to form high density caustic magnesia pellets and recovered as indicated by arrow 8. Alternatively, the magnesium hydroxide pellets can be fed to a kiln as indicated by arrow 9 where they are subjected to higher temperatures and dead-burned to form high density magnesia pellets and recovered as indicated by arrow 10. The magnesia pellets formed in this manner are characterized by unusually high bulk densities of greater than 3.4 grams per cubic centimeter.

The amounts of caustic magnesia and magnesium hydroxide slurry fed into the high energy mixer are preferably those providing a mixture comprising about equal parts of magnesia, magnesium hydroxide and water, although the quantities of each may differ from one another by as much as 10%.

The temperature of the mixer maintains at about 100°C. due to heat of reaction of the hydrating magnesia and from frictional heat generated by the high intensity mixing. Mixing temperature is essentially self-regulating as free water vaporizes to steam. The finished pellets are therefore dry as the free water introduced has combined to form $Mg(OH)_2$ or flashed off as vapor.

The counter-current high energy mixers utilized in this invention are of the type described in the following U.S. Pats: Weigel, 3,109,632 and Eirich et al 3,379,419; 3,414,239; 3,420,507 and 3,674,241, the disclosures of which are hereby incorporated herein by reference. The high energy mixers utilized in this invention are of the type having a rotating pan which rotates in a direction opposite to the direction of rotation of at least some of the mixing tools. Material in the mixer is moved at a high velocity in different directions to rapidly and thoroughly mix all of the material. Mixers of this type are commonly referred to in the art as high intensity or high energy counter-current mixers.

Figure 3:
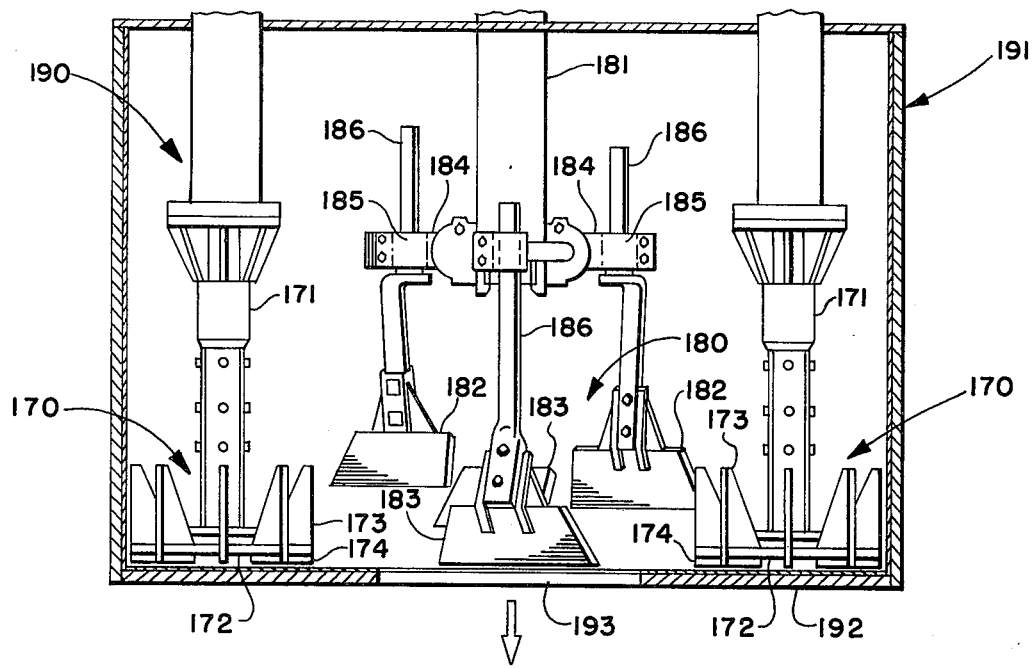
FIG. 3 is a transverse sectional view of a pan mixer with three mixing tools.

FIG. 3 is a transverse sectional view of a countercurrent high energy mixer of the type useful in this invention. The mixer comprises a mixer bowl or container 190 having a cylindrical side wall 191 and a circular bottom wall 192 having a circular discharge opening 193. FIG. 3 illustrates the use of two mixing rotors 170 and one mixing paddle or plate system 180. Since high energy mixers of this type are sufficiently well known to those skilled in the art, constructional details such as the drive means, control means, mounting of the bowl, mixing tools, etc., have not been illustrated in the drawing.

The two mixing rotor systems 170 are illustrated as being identical although they may be different. The rotor system 170 is secured to rotary shaft 171. A component part of the rotor system is a flat, disc-shaped rotary element 172 which is attached to the free end of the rotary shaft 171. A plurality of blades 173 are arranged on the outer periphery of rotary element 172, and these blades may be fastened to rotary element 172 such as by welding, screwing, keying, etc. FIG. 3 shows short extensions 174 of blades 173 below the rotary element 172 which cause movement of the material below the rotary element and reduce friction which occurs due to the interaction of the material being mixed and the underside of rotary element 172. Though not shown in FIG. 3, the blades 173 may be attached to the underside of rotary element 172 and the ends directed to the bottom of mixing bowl 190. Additional examples of modifications in the design of the high energy rotor mixing system are described in the art such as, for example, in U.S. Pat. 3,674,241.

In addition to the mixing rotors 170, FIG. 3 illustrates the use of a mixing paddle system 180 which includes an upwardly extending drive shaft 181 which is eccentric relative to mixing bowl 190. Four radial arms 184 are attached to drive shaft 181. At the free end of radial arms 184 are secured fastening sleeves 185 through which the upper ends of paddle carrying rods 186 pass at which point the positions of rods 186 are fixed. Each of rods 186 extends downwardly into mixing bowl 190 substantially parallel to drive shaft 181. Mixing blades or paddles 182 and 183 are fastened to the lower end of each of rods 186. Paddles 182 are positioned slightly above paddles 183 which are positioned slightly above bottom wall 192. Mixing paddles of this type are described more fully in U.S. Pat. 3,414,239.

While the mixer shown in FIG. 3 illustrates the use of three mixing tools arranged eccentrically about the mixing bowl, it should be understood that additional and/or different mixing tools can be utilized. The respective mixing tool system may be driven by a common motor or individual motors. The operation of the high energy mixer illustrated in FIG. 3 is well known to those skilled in this art. In general, the bowl will rotate in one direction and at least one of the mixing tool systems is arranged to rotate in the opposite direction. As the shafts 171 and 181 are rotated, the material in the bowl is thoroughly mixed and gradually moved toward discharge opening 193 in the bottom wall 192 of the bowl. The discharge opening is closed by suitable means during mixing and is opened only at the end of the mixing operation and when the pellets have been formed.

In another arrangement, which is not illustrated, the mixer includes: one mixing star with paddles similar to that shown in FIG. 3; two high energy rotors of the type described with respect to FIG. 3; two kneading tools of the type described in Eirich U.S. Pats. 3,379,419 and 3,414,239; two disc blades; and at least one wall scraper of the type shown in Eirich et al U.S. Pat. 3,420,507.

In operation, the caustic magnesia and magnesium hydroxide slurry are fed into the top of the mixer and vigorously mixed until the pellets are formed. The magnesia and magnesium hydroxide slurry may be added at ambient temperature or preheated to a temperature up to about 100°C. to hasten the hydration reaction As the caustic magnesia is hydrated in the high energy mixer and excess free water is driven off, the mixture dries and agglomerates. The high intensity mixing action forms the mixture into substantially spherical pellets of varying diameters. The pellets are formed simultaneously with hydration of the caustic magnesia, and substantially all of the caustic magnesia is hydrated. This prevents layering of the pellets and formation of internal water pockets which would produce pores when the pellets are deadburned. Operation of the mixing tools is timed so that they are turned off after substantially all of the mix is formed into pellets and before the high intensity mixing action begins to break up the pellets.

The pellets which are to be deadburned are advanced to any suitable and economical type of kiln such as a commercial rotary kiln. The deadburning in the kiln will generally take place at a temperature above about 1500°C. and is preferably accomplished at a temperature of about 1650°C. In some instances, the magnesium hydroxide pellets obtained from the high energy mixer may be mechanically compressed into briquettes and then deadburned. The substantially spherical configuration and good density of the magnesium hydroxide pellets allows them to be packed very tightly into dense briquettes without precompaction or recycling. Alternatively, the spherical hydroxide pellets can be calcined and then dry briquetted. Each of these procedures allows substantial improvement in briquetting equipment capacity.

FIGS. 4A and 4B show an apparatus for making high density pellets in accordance with the present invention. FIG. 4A illustrates the use of three separate furnaces and high energy mixers for treating the slurry from tank 12. Additional or fewer furnaces and mixers can be utilized depending upon their capacities and the capacity of tank 12.

High purity magnesium hydroxide is obtained from sea water or brine by mixing slaked dolomitic lime (dolime) or slaked high calcium lime with sea water. Calcium hydroxide in the slaked dolime or slaked high calcium lime reacts with magnesium chloride and magnesium sulfate in the sea water to precipitate magnesium hydroxide. The high purity magnesium hydroxide is washed to remove soluble salts. The magnesium hydroxide is filtered to obtain a filter cake containing around 50% magnesium hydroxide and 50% water. This filter cake is often referred to as a mud or slurry. The filter cake is fed to agitator tank 12 having an agitator 14 for stirring the filter cake to maintain a substantially homogenous mixture.

Portions of the slurry are drawn from agitator tank 12 through conduits 16 by pumps 18 and fed to furnaces 22. The filter cake is lightly calcined in furnaces 22 at a temperature of around 1650°F. to produce caustic magnesia. A spare outlet conduit 24 and pump 26 may be provided for withdrawing filter cake from agitator tank 12 for other uses.

Caustic magnesia is fed from furnaces 22 to separators 28 from which caustic magnesia may be diverted as indicated by arrows 30 for other uses. At least some of the caustic magnesia is fed as indicated by lines 32 to two-way diverter valves 34. Caustic magnesia is fed in the direction indicated by lines 36 to bins 40 having bottom discharge outlets for discharging caustic magnesia as indicated by lines 42 to conveyors 44 which may be, for example, screw conveyors. Conveyors 44 discharge caustic magnesia as indicated by lines 46 into batch holding bins 48 which selectively discharge caustic magnesia through a bottom outlet as indicated by arrows 50. The caustic magnesia is fed into high intensity counter-flow mixers 52.

Some of the filter cake is drawn from agitator tank 12 through conduits 56 by pumps 58. The slurry flows through flow meters 60 having regulating devices 62. The filter cake or slurry is then fed as indicated by lines 64 to high intensity mixers 52 through tube valves 66.

In one arrangement, batch bins 48 each hold a batch of around 1,250 pounds of caustic magnesia. The batch bin outlets are open to discharge caustic magnesia into mixers 52 simultaneously with opening of valves 66 to feed magnesium hydroxide slurry to mixers 52. Valves 66 are open for a sufficient period of time to feed 2,600 pounds of magnesium hydroxide slurry to mixers 52. The caustic magnesia and magnesium hydroxide slurry are preferably fed at metered rates so that the described quantities will be in mixers 52 after a predetermined time. The magnesium hydroxide slurry contains approximately 1300 pounds of free water and 1300 pounds of magnesium hydroxide. Therefore, substantially equal quantities by weight of water, caustic magnesia and magnesium hydroxide are fed to mixers 52.

Either or both of the caustic magnesia and magnesium hydroxide slurry may be heated so that the mixture in mixers 52 will commence to hydrate. The caustic magnesia and magnesium hydroxide slurry are rapidly intermixed with one another in mixers 52. During the mixing operation, the caustic magnesia is simultaneously being hydrated with water from the magnesium hydroxide slurry in an exothermic reaction where the heat forms steam to drive off excess free water in the mix. With the described quantities, around 850 pounds of water are driven off as steam. The steam is exhausted as indicated by arrows 70 to washers 72 for dust control. Washers 72 are connected with blowers 74 and a water supply for sprayers 76. Washers 72 discharge to a sump as indicated by lines 78.

As the caustic magnesia is hydrated and free water is driven off, the mix dries and agglomerates. The high intensity mixing action forms the mix into substantially spherical pellets of varying diameters. Operation of mixers 52 is timed so that they are turned off after substantially all of the mix is formed into pellets and before the high intensity mixing action starts to break up the pellets.

The pellets are discharged from mixers 52 as indicated by lines 80 into holding bins 82 which discharge as indicated by lines 84 to vibratory feeders 86. Vibratory feeders 86 feed the pellets onto a belt conveyor 88 which discharges into a bucket elevator 90. Bucket elevator 90 discharges pellets as indicated by line 94. All of the pellets may then be fed over a bypass indicated at 96 onto a belt conveyor 98, or may be fed as indicated by arrow 102 onto sizers 104 and 106. Sizer 104 may be of a +6 Tyler Screen so that pellets having a diameter greater than 0.132 inches will be fed as indicated by arrow 108 onto conveyor 98. Smaller pellets and other fines fall onto sizer 106 which may be of a +16 Tyler Screen. Pellets having a diameter greater than 0.0394 inches may then be fed as indicated by arrow 108 onto conveyor 98, or may be fed as indicated by line 110 to conveyors 112 and 114 feeding into a storage hopper 116. Smaller pellets and fines are fed as indicated by line 118 to screw conveyor 120. Lines 110 and 118 may be cross-connected as indicated at 122 and 124 so that various sizes of pellets may be fed to any desired location.

Extremely small pellets and other fines fed to screw conveyor 120 are discharged into a pre-densifying bin 128 which discharges as indicated by lines 130 to mechanical pelletizers 132. Pelletizers 132 may be of the type including opposed rolls having opposed recesses therein. As the small pellets and other fines pass through the rolls, the material enters the recesses and is compressed into briquettes. These birquettes are discharged as indicated by line 134 to screw conveyor 136 which discharges as indicated by line 138 to bucket elevator 140. Bucket elevator 140 discharges as indicated at 142 onto a +3 Tyler Screen 144. Fines are discharged as indicated by line 146 to screw conveyor 148 for being fed as indicated by line 150 back into pre-densifying bin 128. The larger briquettes are discharged as indicated by line 152 onto conveyor 98.

Pellets are discharged from conveyor 98 to a holding bin 156 which discharges as indicated at 158 to a screw conveyor 160 feeding the pellets to a rotary kiln 162. Rotary kiln 162 feeds the pellets as indicated by arrow 164 to a holding bin 166. Although a rotary kiln has been described, it will be recognized that a shaft kiln may also be used. The magnesium hydroxide pellets are deadburned at a temperature of around 1650°C. in kiln 162 to produce high density, non-layered magnesium oxide pellets having a substantially spherical shape.

Magnesium oxide pellets produced in accordance with the procedure described with respect to FIGS. 4A and 4B have, after deadburning, a substantially spherical configuration and a bulk density of at least 3.4 grams per cubic centimeter. Bulk density is determined in accordance with the ASTM procedure identified as C493-70. Pellets produced on different days have the following screen analyses as shown in the table below. Green indicates pellets directly from the mixer and fired represents the same pellets after deadburning.

| Screen Analysis, %/w | SAMPLE A | | SAMPLE B | |
| --- | --- | --- | --- | --- |
|  | Green | Fired | Green | Fired |
| + ⅜" | 3.7 | 2.7 | 7.6 | 0.7 |
| −⅜"+ 3 mesh | 3.1 | 3.3 | 7.0 | 5.0 |
| − 3 + 4 mesh | 5.1 | 4.9 | 16.5 | 8.4 |
| − 4 + 6 mesh | 12.4 | 6.0 | 25.6 | 19.6 |
| − 6 + 8 mesh | 22.8 | 10.9 | 21.7 | 25.0 |
| − 8 + 10 mesh | 28.1 | 19.7 | 11.4 | 21.4 |
| − 10 + 20 mesh | 23.0 | 43.7 | 8.0 | 16.2 |
| − 20 mesh | 1.8 | 8.8 | 2.2 | 3.7 |
| Bulk Density, g/cc (fired pellets) |  | 3.43 |  | 3.45 |

| Screen Analysis, %/w | SAMPLE C | | SAMPLE D | |
| --- | --- | --- | --- | --- |
|  | Green | Fired | Green | Fired |
| +⅜"3/8" | 5.9 | 1.4 | 12.0 | 2.0 |
| −⅜"+ 3 mesh | 6.7 | 5.5 | 20.8 | 8.5 |
| − 3 + 4 mesh | 13.2 | 7.7 | 24.7 | 21.0 |
| − 4 + 6 mesh | 21.1 | 11.3 | 18.4 | 27.0 |
| − 6 + 8 mesh | 24.0 | 21.4 | 13.6 | 18.1 |
| − 8 + 10 mesh | 17.1 | 28.0 | 6.6 | 13.7 |
| − 10 + 20 mesh | 9.5 | 22.0 | 2.2 | 9.0 |
| − 20 mesh | 2.5 | 2.7 | 0.8 | 0.7 |
| Bulk Density, g/cc (fired pellets) |  | 3.48 |  | 3.44 |

From the above, it will be seen that pellets of different sizes are produced and these deadburned pellets have high density and corresponding low porosity. This high density and low porosity pellet enables the manufacture of refractory bricks and linings of improved density which may increase the useful life of a refractory lining to a great degree.

The above examples and illustrations of the procedure of this invention produce hard, dense, spherical pellets of random size which can be fired directly to spherical refractory particles. The pellets also can be fed to a briquetting operation without the need of pre-compaction and/or recycling thereby increasing the efficiency of that operation. The utilization of the dense, dry, spherical magnesium hydroxide pellets described significantly increases the calcining and deadburning capacity of a refractory plant and effects a conservation of fuel as compared to many existing practices for the production of refractory grain.

In addition to their usefulness in the formation of refractory particles, the random size pellets of magnesium hydroxide and caustic magnesia described above are useful as a cattle food supplement, fertilizers, in filter beds and automatic pH control of effluents, in beds for removal of iron or manganese, in beds to deiron caustic solutions, in neutralization beds and as catalyst carriers. Small amounts of additives commercially used in the manufacture of various grades of deadburned magnesite and deadburned dolomite including, but not limited to silica iron oxide, chromium oxide and boron oxide may be included in the pellets of the invention. These additives may be supplied as finely ground natural minerals, mineral concentrates or chemical compounds as sources as are customarily used in the manufacture of deadburned magnesite and deadburned dolomite. The metallic carbonates and hydroxides of natural minerals may be used in the spherical pellet forming operation. The present invention includes equivalent alternatives and modifications and is limited only by the scope of the claims The embodiments of the invention in which an exclusive property or privilege is claimed are defined as follows:

1. A method of making magnesium hydroxide pellets comprising the steps of mixing caustic magnesia, magnesium hydroxide and water in a rotatable mixing bowl containing a plurality of mixing tools eccentrically placed within the mixing bowl, rotating the mixing bowl about its axis of rotation while simultaneously subjecting the ingredients therein to the action of the rotating mixing tools wherein at least one of said mixing tools is rotated in the direction opposite to the direction of rotation of the mixing bowl, whereby the caustic magnesia hydrates in an exothermic reaction and excess water is driven off to form magnesium hydroxide pellets in the mixing bowl.

2. The method of claim 1 wherein at least one of the mixing tools comprises a mixing device mounted on a shaft having an axis of rotation spaced from the axis of rotation of said bowl and having a flat rotary element carried on said shaft and mixing elements fixed on said flat rotary element, said mixing elements being in the form of longitudinally extending members projecting generally upwardly from said flat rotary element at circumferentially spaced locations disposed radially outwardly of said shaft, said flat rotary element and mixing elements being disposed below the level of the material which is being mixed in the bowl.

3. The method of claim 2 wherein the mixer also contains a system of mixing paddles mounted for rotation about an axis spaced from and parallel to the axis of rotation of the mixing bowl.

4. The method of claim 1 wherein the caustic magnesia is obtained by calcining a portion of a magnesium hydroxide slurry.

5. The method of claim 1 wherein at least one of the mixing tools comprises a rotatable upright shaft, rod mounting means fixed to the lower end of said shaft for rotation therewith, and a plurality of substantially rectilinear rods carried by said mounting means and extended downwardly into said mixing bowl, said rods having upper fixed ends secured to said mounting means and lower free ends free of connection to each other.

6. The method of claim 1 wherein the mixing is carried out at a temperature of about 100°C.

7. The method of claim 1 wherein the quantities of caustic magnesia, magnesium hydroxide, and water combined in the mixing bowl are within about 10% of each other.

8. The method of claim 1 wherein about equal parts by weight of caustic magnesia, magnesium hydroxide and water are combined in the mixing bowl.

9. The method of claim 1 wherein the pellets are then dead-burned in a kiln to form dense non-layered, substantially spherical, dead-burned magnesium oxide pellets, a substantial portion of which have a bulk density in excess of 3.4 grams per cubic centimeter.

10. The method of claim 1 wherein at least one of the ingredients is heated to ensure that the caustic magnesia will hydrate when the ingredients are combined and mixed.

* * * * *